(12) United States Patent
Schlansker et al.

(10) Patent No.: US 7,194,609 B2
(45) Date of Patent: Mar. 20, 2007

(54) BRANCH RECONFIGURABLE SYSTEMS AND METHODS

(75) Inventors: Michael S. Schlansker, Los Altos, CA (US); Boon Seong Ang, Sunnyvale, CA (US); Philip J. Kuekes, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 725 days.

(21) Appl. No.: 10/214,990

(22) Filed: Aug. 8, 2002

(65) Prior Publication Data

US 2004/0030871 A1 Feb. 12, 2004

(51) Int. Cl.
G06F 15/163 (2006.01)
(52) U.S. Cl. ...................................... 712/233
(58) Field of Classification Search ................ 712/233, 712/24
See application file for complete search history.

(56) References Cited

U.S. PATENT DOCUMENTS

| | | | | |
|---|---|---|---|---|
| 5,127,092 A | * | 6/1992 | Gupta et al. | 712/234 |
| 5,408,658 A | * | 4/1995 | Rechtschaffen et al. | 712/216 |
| 5,913,055 A | * | 6/1999 | Yoshida et al. | 712/233 |
| 5,926,643 A | * | 7/1999 | Miura | 712/7 |
| 6,054,871 A | * | 4/2000 | New | 326/39 |
| 6,079,008 A | * | 6/2000 | Clery, III | 712/11 |
| 6,255,849 B1 | | 7/2001 | Mohan | |
| 6,366,999 B1 | * | 4/2002 | Drabenstott et al. | 712/24 |
| 6,883,084 B1 | * | 4/2005 | Donohoe | 712/1 |
| 7,051,194 B2 | * | 5/2006 | Uneyama et al. | 712/225 |

OTHER PUBLICATIONS

Mirsky, Bhan, et al, "Matrix: A Reconfigurable Computing Architecture with Configurable Instruction Distribution and Deployable Resources," [online] [Retrieved on: Feb. 26, 2002] Retrieved from: www.cs.caltech.edu/research/ic/transit/tn127/tn127.html. pp. 1-14.
"1.62 Multiple Instruction Multiple Data (MIMD)", [online] [Retrieved on: Feb. 26, 2002] Retrieved from: www.epcc.ed.ac.uk/epcc-tec/documents/intro-course/Intro.book_11.html, pp. 1-3.
"VLIW at IBM Research," [online] [Retrieved on: Feb. 26, 2002] Retrieved from: www.research.ibm.com/vliw/, pp. 1-2.
"An Introduction to Very-Long Instruction Word (VLIW) Computer Architecture," Philips Semiconductors, pp. 1-11.

(Continued)

*Primary Examiner*—Eric Coleman (57) ABSTRACT

The invention is a system and method for executing programs. The invention involves a plurality of processing elements, wherein a processing element of the plurality of processing elements generates a branch command. The invention uses a programmable network that transports the branch command from the processing element to one of a first destination processing element by a first programmed transport route and a second destination processing element by a second programmed transport route. The branch command is received and processed by one of the first destination processing element and the second destination processing element, and is not processed by the other of the first processing element and the second processing element.

26 Claims, 3 Drawing Sheets

OTHER PUBLICATIONS

U. S. Appl. No 10/215,095, Schlansker.

U.S. Appl. No. 10/215,300, Schlansker et al.

Wolfe, A., et al, "A Variable Instruction Stream Extension to the VLIW Architecture," ASPLOS IV, (1991) pp. 2-14.

New burn, C.J., et al, "Balancing Fine- and Medium-Grained Parallelism in Scheduling Loops for the XIMD Architecture," Architecture and Compilation Techniques for Fine and Medium Grain Parallelism (A-23), (1993) pp. 39-52.

"What is Compiler-Oriented Architecture?," [online] [Retrieved on: Feb. 26, 2002] Retrieved from: www.ece.purdue.edu/ hankd/ CARPVIEW/index.html, pp. 1-5.

* cited by examiner

BRANCH RECONFIGURABLE SYSTEMS AND METHODS

CROSS-REFERENCE TO RELATED APPLICATIONS

This application is related to co-pending and commonly assigned U.S. patent application Ser. No. 10/215,300 entitled "System and Method for Self Configuration of Reconfigurable Systems," and U.S. patent application Ser. No. 10/215,095 entitled "System and Method Using Differential Branch Latency Processing Elements," filed concurrently herewith, the disclosures of which are hereby incorporated herein by reference.

FIELD OF THE INVENTION

This invention relates in general to computers, and in specific to a system and method that provides a reconfigurable processor.

BACKGROUND OF THE INVENTION

Typical general purpose computer systems comprise one of many different architectures. Architecture, as used herein, refers to the instruction set and resources available to a programmer for a particular computer system. Thus, architecture includes instruction formats, instruction semantics, operation definitions, registers, memory addressing modes, address space characteristics, etc. An implementation is a hardware design or system that realizes the operations specified by the architecture. The implementation determines the characteristics of a microprocessor that are most often measured, e.g. price, performance, power consumption, heat dissipation, pin number, operating frequency, etc. Thus, a range of implementations of a particular architecture can be built, but the architecture influences the quality and cost-effectiveness of those implementations. The influence is exerted largely in the trade-offs that must be made to accommodate the complexity associated with the instruction set.

Most architectures try to increase efficiency in their respective implementations by exploiting some form of parallelism. For example, in single instruction multiple data stream (SIMD) architecture implementations, the various processing elements (PEs) can all perform the same operation at the same time, each with its own local (different) data.

One common architecture is the very long instruction word (VLIW) architecture. Although very similar to SIMD systems, a VLIW can perform a different operation on each PE within a single cycle. The grouping of operations that PEs can execute together on a cycle is statically determined. In other words, the choice of which operations that can simultaneously execute together is made at compile time. Moreover, their execution is synchronous. This means that each of the PEs is processing the instructions in a lock-step manner. Note that VLIW PEs are sometimes referred to as function units (FUs).

Another common architecture is the multiple instruction stream, multiple data stream (MIMD) architecture. In MIMD systems, each processor is operating independently of the other processors. A MIMD processor may be as small as a single PE. Thus, MIMD is more flexible than SIMD or VLIW, because MIMD allows for a wider range of parallel control flow constructs to be directly implemented. However, MIMD asynchrony yields a multitude of problems that neither SIMD nor VLIW machines evidence. One problem is that it is very expensive for processors within a MIMD machine to communicate with each other, which often results in MIMD parallelism unexpectedly slowing down the program because communication overhead exceeded increased speed achieved by parallel execution. The static timing properties of SIMD and VLIW facilitates static orchestration that enables communication between PEs without undue overhead.

Another architecture is XIMD, which is similar to MIMD, and was developed at Carnegie Mellon. XIMD uses an array of PEs, wherein each PE includes an independent branch unit. Thus, in one mode the PEs could run autonomously and independently, but they could share a branch condition. The PEs could all test the same branch condition, and then branch in harmony. In other words, replicating the same control flow sequence on all PEs, and then having all PEs test a common set of branch conditions, effectively converts the XIMD architecture processor into a VLIW architecture processor, because each processor would branch the same way in response to the same branch condition each time. However, an XIMD processor cannot directly cause another processor to branch. The processor must change a shared Boolean condition code that is visible to other PEs. The condition code itself does not force those processors to branch. Those processor have to simultaneously execute branch instructions that test this condition code and branch to their separate but closely related branch targets. To emulate a VLIW, all the participating PEs execute separate branch instructions test the shared condition code. The participating PEs have to execute highly orchestrated programs that follow closely related paths of execution. This greatly complicates many aspects of branching, e.g. indexed branches, dynamically linked branches, or other multi-way branches. Consequently, generating software for XIMD PEs is very complex. XIMD architecture only passes single bit (Boolean) condition code to other processors. For further information, please review Wolfe, A., "A Variable Instruction Stream Extension to the VLIW Architecture," in Proceedings of ASPLOS IV, 1991, pp. 2–14; and Newburn, C. J., et al. "Balancing Fine- and Medium-grained Parallelism in Scheduling Loops for the XIMD Architecture," Proceedings of Architecture and Compilation Techniques for Fine and Medium Grain Parallelism (A-23), 1993, pp. 39–52; which are both hereby incorporated herein by reference.

SIMD, VLIW, and MIMD architecture systems can be implemented using a field programmable gate array device (FPGA). FPGAs can be electrically programmed to perform various specific logic functions and have been configured to operate as a VLIW processor.

BRIEF SUMMARY OF THE INVENTION

The invention is a system and method for executing programs. The invention involves a plurality of processing elements, wherein a processing element of the plurality of processing elements generates a branch command. The invention uses a programmable network that transports the branch command from the processing element to one of a first destination processing element by a first programmed transport route and a second destination processing element by a second programmed transport route. The branch command is received and processed by one of the first destination processing element and the second destination processing element, and is not processed by the other of the first processing element and the second processing element.

DETAILED DESCRIPTION

The invention enables a computer architecture that supports both the VLIW and the MIMD models of computation. Thus, a single computer is reconfigurable to be used both as a synchronously scheduled VLIW processor, as well as multiple asynchronous MIMD processors. The invention preferably controls branching behavior such that a single branch in one situation may affect a common set of processing elements (PEs) in the manner of a VLIW architecture, or each PE autonomously executes branches that affect only itself in the manner of a MIMD architecture. Thus, the invention preferably allows seamless switching between the lock-step oriented VLIW architecture where a plurality of PEs operate as a single processor, and the autonomous or independent MIMD architecture where each PE operates a separate processor. Note that more generally, a single processor in a MIMD system may comprise more than one PE. The invention preferably allows switching between VLIW and MIMD in a single branch cycle. Note that a processor may comprise separate components or processing elements (PEs).

In VLIW mode, the PEs execute in a lock step manner from the same point in the program, but each PE may have a different program schedule. Thus, while each PE may have a different role to play in the execution of the program, they collaborate intimately according to a common clock. The intimate collaboration preferably uses the ability to statically determine, i.e. at compile time, the relative rate of program execution on different PEs. With this knowledge, the compiler can, for example, plan out execution on different PEs so that values produced on one PE can be made available in time for use on another PE. A system with this kind of static predictability is co-synchronous. Generally, the entire system is driven from a common clock. (Parts of it may run at some multiple or sub-multiple of the common clock frequency, but there is a fixed known relationship.) In co-synchrony, the system should not introduce non-determinacy, such as through complex dynamic choices.

Note that a branch reconfigurable system of the present invention is not only switchable between VLIW mode and MIMD mode, but may support mixtures of both. For example, a portion of the PEs may be operating in MIMD mode, while the remainder operate in a single VLIW mode. Furthermore, a branch reconfigurable system may operate in multiple VLIW modes. For example, a portion of a branch reconfigurable system may be operating in a first VLIW mode and another portion of it may be operating a second VLIW mode. The execution in the first portion or cluster is independent of the execution in the second cluster; however execution within each cluster is lock-step. Thus, the invention permits a branch reconfigurable system to operate in both MIMD and/or VLIW modes.

In the MIMD mode, when data is computed within one cluster, and later consumed by another cluster, data is typically exchanged using traditional synchronization techniques. Techniques such as: semaphores, barriers and monitors have been developed in order to allow MIMD processors to cooperate and correctly exchange data or share resources between clusters. When program tasks are difficult to predict, the MIMD mode of operation is preferred, because it allows multiple tasks to proceed in parallel without undue orchestration. Note that in MIMD mode, each cluster may be executing a different program, or each cluster may be executing different portions of the same program, or a combination thereof.

However, the runtime synchronization that is necessary for MIMD mode can increase the computational overhead of tasks. Where it is unnecessary, e.g. when program tasks are predictable, it is preferable to eliminate the runtime synchronization, and operate in VLIW mode. In such settings, tasks can be statically orchestrated in a highly synchronized manner. In the VLIW mode, a task is decomposed into highly predictable operations that are executed in parallel. Because the processing elements are controlled by a common clock signal, data can be exchanged and resources can be shared by the processing elements without using any routine synchronization. For processing elements operating in VLIW mode, the time needed to perform each operation is predictable, and known at compile time. A compiler schedules operations on all function units in order to guarantee that data is computed before it is needed and that resources are not used for multiple purposes at the same time. Instructions are presented in parallel and in lock-step sequence across all function units. Synchronization that was orchestrated at compile time is retained at runtime due to the predictable and lock-step nature of execution in the VLIW mode processing elements.

Figure 1:
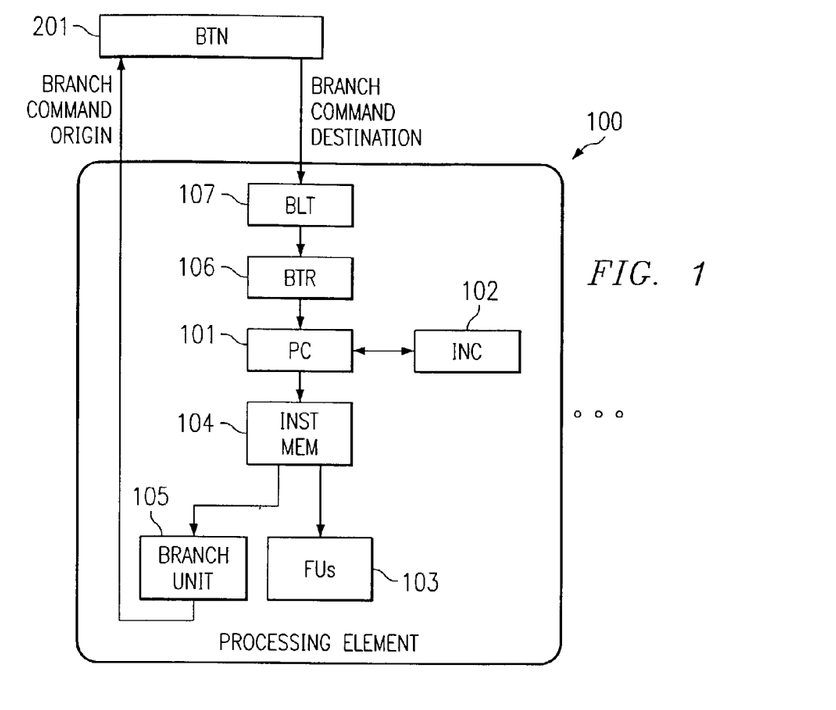
FIG. 1 depicts a block diagram of an example of an instruction-based processing element according to an embodiment of the invention.

FIG. 1 shows a block diagram of an example of an instruction-based processing element of the present invention, shown as processing element 100. When processing element 100 is operating in the VLIW mode, it is operating with all of the other processing elements of the system as a single cluster. In this mode, a branch instruction that is generated within an originating processing element, is used to simultaneously cause all processing elements within the common cluster to branch to predictable program locations that can be statically scheduled by a VLIW compiler. Since all processing elements are driven by a common clock signal, the processors can be engineered to move in lock-step harmony as is required to allow VLIW static scheduling.

The invention also allows processing elements, such as processing element 100 of FIG. 1, to operate in a mixed mode, where some of the processing elements are in MIMD mode and other processing elements are in VLIW mode. In other words, with a cluster, the processing elements are operating in VLIW mode with respect to each other, but between clusters, the processing elements are operating in MIMD mode with respect to each other. For example, in a system with 20 processing elements, the system may be configured for 20 clusters, each comprising a single processing element. This arrangement is the full or extreme MIMD mode for the system. In another example, the system is configured with 1 cluster comprising 20 processing elements. This arrangement is the full or extreme VLIW mode for the system. In another example, the system comprises seven clusters, with the first cluster comprising 4 processing elements, the second cluster comprising 6 processing elements, the third cluster comprising 1 processing element, the fourth cluster comprising 2 processing elements, the fifth cluster comprising 2 processing elements, the sixth cluster comprising 1 processing element, and the seventh cluster comprising 4 processing elements. This arrangement is an example of a mixed mode for the system. In another example, the system may comprise 10 clusters, with each cluster comprising 2 processing elements. This arrangement is another example of a mixed mode for the system.

The mode of the system may be configured statically when the system is initially programmed. Thus, a single computer system may be statically programmed to a particular mode (or to a particular implementation of the mixed mode) when particular applications are loaded for execution. Thus, if a first application is better suited to one mode configuration, and second application is better suited to another mode configuration, then the desired mode can be programmed when each program is loaded.

Note that mode reconfiguration may also be performed during program execution or dynamically. Thus, the system mode configuration may change as the program is being executed. For example, a single VLIW thread of execution running on a multiple processing element cluster might undergo a fission process. Thus, after a reconfiguration is performed, the multiple processing element cluster has been divided into a plurality of single processing element clusters. As another example, multiple distinct threads of execution operating on a plurality of clusters might undergo a fusion process. Thus, after reconfiguration is preformed, the plurality of clusters are merged into a single large cluster. Note that reconfiguration may be triggered by operation of the program being executed, or by a separate entity that has determined that the program (or a portion thereof may execute more efficiently and/or faster in a different mode configuration. Note that reconfiguration may involve a change from MIMD to VLIW (or vice versa), from MIMD to mixed mode (or vice versa), from VLIW to mixed mode (or vice versa), or from one mixed mode configuration to a different mixed mode configuration.

Embodiments of the invention use a branch transport network to control the flow of branches, as well as their interpretation by the processing elements. Each processing element preferably includes a program counter which enables the PE to increment during execution of a program. During execution of the program, a PE would generate one or more branches, e.g. a conditional branch that causes the execution to branch or jump to another part of the program (or a different program) if a specified condition is satisfied, or otherwise proceed in the normal execution sequence. In the invention, the branch is preferably delivered to the branch transport network, and in addition returned to the same processing element. From the network, the branch may then be provided to one or more other PEs, and each PE may then respond to the branch and operate in a lock-step VLIW mode with the originating PE.

In one preferred embodiment, the branch is conveyed across PEs using a branch command comprising of two elements: (a) a route ID, and (b) a branch target name. The branch process begins when an origination PC inserts a branch command into the branch transport network. The route ID defines a tree within the branch transport network that is traversed by the branch command as it propagates from its origin to its intended destination PE(s). When the branch command is received at each destination PE, the branch target name is used to determine a branch target address in the destination PE's instruction memory. Execution on the destination PE then jumps to that address.

The invention also preferably uses table lookups or registers. A branch command would preferably have a branch target name that indirectly references the instruction memory. Each PE would then perform a lookup using the target name to find the actual location of the branch target instruction in its memory. The location of the target instruction can therefore be different in each PE, while accommodating a common branch target name. Since the instructional memory layout can be different for each PE, this allows each PE to more efficiently use its memory. For systems that do not use branch target lookup, when a branch is taken, the target instructions should be located at the same memory address in all PEs in the same cluster. In general, each PE executes a different number of instructions between branch target instructions. Achievement of the alignment of VLIW branch targets on different PEs may require padding with many no-op instructions (no operating instructions). By using table lookup, the instructions are referenced by the target name, but may reside anywhere in the PE's memory. This works as long as each of these basic blocks on each of these PEs have been scripted correctly by the compiler. In other words, they have been carefully orchestrated so that they operate together on a cycle-by-cycle basis.

Note that some PEs are physically closer to an originating PE than others. Thus, the delivery time of the branch to more distant PEs may be longer than the delivery time to closer PEs. The invention preferably uses latency padding buffers to equalize the delivery time of the branch commands to the PEs. The latency padding buffers would hold the branch command for a time. The hold duration in the latency padding buffer may be based on location of the destination PE from the source PE. In some realizations, the amount of padding is selected so that every PE in the same cluster would receive the branch at the same clock cycle. Note that for a plurality of PEs, padding buffer hold time would be determined for each PE from all viewpoints, i.e. each PE as a destination and the remaining PEs as sources.

FIG. 1 depicts a preferred embodiment for a processing element 100 according to the invention. The processing element 100 is a portion of a larger system that is executing a program. The processing element 100 includes a program counter (PC) 101 that indexes into an instruction memory 104 that holds instructions of the program. An incrementor 102 increments the program counter across instructions of fixed or variable width. Instructions, taken from the indexed location in the instruction memory 104, are used to control the actions of one or more functional units 103, as well as a branch unit 105. The functional units 103 handle the actual processing of the instructions such as performing the loads, stores, arithmetic operations, etc. The branch unit 105 computes a branch target name from a branch instruction. The target branch name preferably corresponds to a location in the program, e.g. a basic block entry point. The branch unit 105 then provides this address to the branch transport network 201, which then delivers the address to appropriate processing elements, including the originating element.

Branch commands sent to the processing element 100 from the branch transport network 201 are translated by the branch lookup table (BLT) 107. When a branch command is received at a PE, the branch target name component of the branch command may be used to perform a table lookup. The branch target name may be translated into a PE specific branch target address. The translated branch target address may be used as the new value for the program counter (PC) 101, causing execution on the PE to jump to this new address. Therefore, all PEs in the same VLIW cluster receive the same branch target name, but do not necessarily branch to the same local branch target address. In some realizations, the branch lookup table 107 may be an associative memory. The associative memory implementation preferably contains only needed entries. An entry is needed in a PE when a branch results in useful work within the PE. In some other realization, that branch lookup table 107 may be a table that is indexed with the branch target name and contains the branch target address. This offers a simpler, potentially faster implementation, but often contains unused entries. What is important is that the branch lookup table 107 offers a way to translate the branch target name into a branch target address. Practitioners knowledgeable in the art will understand that other realizations are possible, including some that reduce the need for a full size branch lookup table.

Note that the increments made to the program counter 101 by incrementor 102 may be more complex than simple increments by 1. The incrementor 102 may interpret variable width or length instructions, e.g. instructions which may comprise one word, two words, or more, and may take one cycle or more to execute. Similarly, no-op instructions may take one or multiple cycles. This is useful when the processing element is in the VLIW mode and is used to delay execution of subsequent instructions whose operands, computed by this or another PE, may not be ready. Multiple cycle no-ops reduce the memory needed to store no-ops, but still allow the processing element to be idled. This arrangement works because the behavior is predictable and VLIW mode uses a static plan.

A PE may go into a stop state periodically. A PE may go into the stop state by executing a stop instruction. Whenever a PE has completed all work assigned to it prior to the next taken branch, it may issue a stop instruction and enter the stop state. Execution resumes when the PE receives a branch from another PE, and branch target translation yields a valid entry. A PE may also enter the stop state as a result of receiving a branch command whose translation fails to yield a valid entry. This situation may arise if a PE has no work for a particular taken branch, while other PEs in the VLIW cluster have work. This feature reduces the need for the idled PE to jump to a stop instruction.

In addition to the branch target name, the branch unit 105 also preferably generates a Route ID that is provided to the branch transport network 201. The Route ID preferably describes the scope of transmission of the branch command through the branch transport network. The processing element 100 may thus be configured in MIMD mode, where it processes the program independently of the other processing elements, or it may be configured in VLIW mode, where it processes the program in a synchronous manner with one or more other processing elements.

In an extreme MIMD mode of operation, each processing element 100 acts as a separate processor. In other words, each cluster comprises a single processing element, generating separate branch target addresses and can branch independently at arbitrary moments in time. The branch transport network 201 transmits branch commands originating within each cluster back to the originating cluster. Once received, the branch command is translated and causes execution on the PE to branch.

In an alternate realization, the branch is decomposed into two parts: "load BTR" command, followed by "branch through BTR" command. In the first command, the branch target name may be transported to the destinations and translated using the branch lookup table (BLT) 107. The resulting branch target address may be left in the Branch Target Register (BTR) 106. The branch is completed when a "branch through "BTR" command is transmitted through the branch transport network 201 to cause the actual branch at a precisely specified moment in time. The branch takes effect when a value stored within the BTR 106 is transmitted into the program counter 101 to alter the flow of control of the program. The BTR may be a small set of multiple registers that holds a few branch target addresses that can be branched to at any moment in time. When the BTR contains multiple registers, both commands should name the specific register that is actually used. The invention may support other branch commands.

Figure 2:
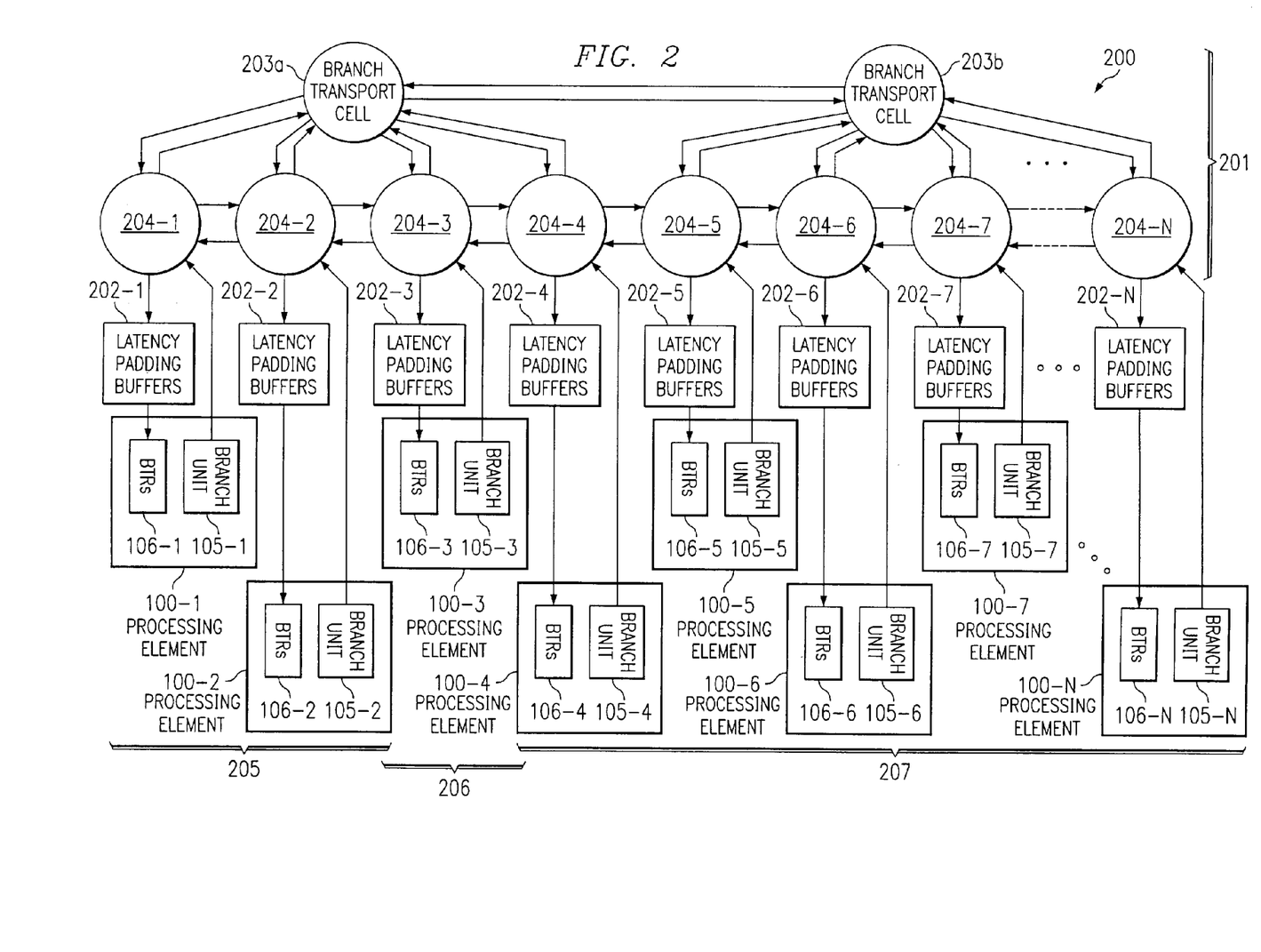
FIG. 2 depicts an arrangement of the branch transport network with a plurality of processing elements of FIG. 1 according to an embodiment of the invention.

FIG. 2 depicts an example of an arrangement of the branch transport network 201 for a plurality of processing elements 100-1 to 100-N. Each processing element may be an instance of the processing element 100 of FIG. 1. Note that the different processing elements can be grouped in clusters as described above. For example, element 100-1 and 100-2 may be grouped together to form a first cluster 205, element 100-3 is the single element of a second cluster 206, and elements 100-4 to 100-N are grouped in a third cluster 207. Note that this arrangement is by way of example only, as the elements can be grouped in different mode configurations.

Branch transport network 201 comprises a plurality of branch transport cells 203, 204 arranged to facilitate the delivery of branch addresses received from an originating processing element back to the originated processing element, as well as every other processing element in the system. Cells 204-1 to 204-N are each connected to a respective processing element 100-1 to 100-N. Branch commands and branch addresses enter the network from a branch unit 105-1 to 105-N within the processing element. Branch commands and addresses are preferably delivered to particular processing elements via branch target registers 106-1 to 106-N to cause branch operations to occur at a branch destination. A latency-padding buffer 202-1 to 202-N is preferably used to carefully control the time of arrival of branch commands. Each respective processing element has an associated buffer.

As shown in the arrangement of FIG. 2, each cell 204 is preferably connected to at least one neighbor cell in a linear sequence. This allows each cell to communicate with its neighbor and in turn its neighbor's neighbor, etc. The cells 203 are provided to accelerate branch propagation across this network. For example, as shown in this arrangement a branch command being sent from element 100-1 to element 100-4, may go to cell 204-1 and then either through cells 204-2 and 204-3 to cell 204-4 (for a total of four cells), or it may go to cell 203a then to cell 204-4 (for a total of three cells). Note that this arrangement is by way of example only, as different numbers of processing elements may result in different arrangements of the cells. For example, as more processing elements are added, more levels of cells may be used, as well as, different numbers of cells may be connected to the upper level cells.

Cell propagation can either proceed combinationally, e.g. without passing through latches, or in a pipelined fashion, e.g. passing through latches, as is needed to maintain an adequate clock cycle time without undue transmission latency (number of required branch transmission clock cycles). With pipelining, the transmission of multiple branches can be overlapped, as long as no two distinct branch commands need to use common resources on any single cycle. Pipelining divides a set of resources into parts so that each part can be used by a distinct branch command at any single moment in time. The parts are also arranged in a sequence, so that as time progresses, a branch command moves along the pipeline and uses the next set of resources.

In one preferred embodiment, a branch command is not propagated to PEs that do not respond to the branch command. Furthermore, it is not propagated over any part of the network that is not on the route from the command's source PE to one of its destination PEs. The purpose is to minimize the network resource consumed by the branch command as it propagates through the network. This is important when multiple VLIW clusters operate on different parts of the branch reconfigurable system at the same time. Thus, in one embodiment, the network resources that may be used by one VLIW cluster is distinct from those that may be used by another VLIW cluster. This ensures that the VLIW clusters can work simultaneously without interference from one another, and without the need for any orchestration between them.

Figure 3:
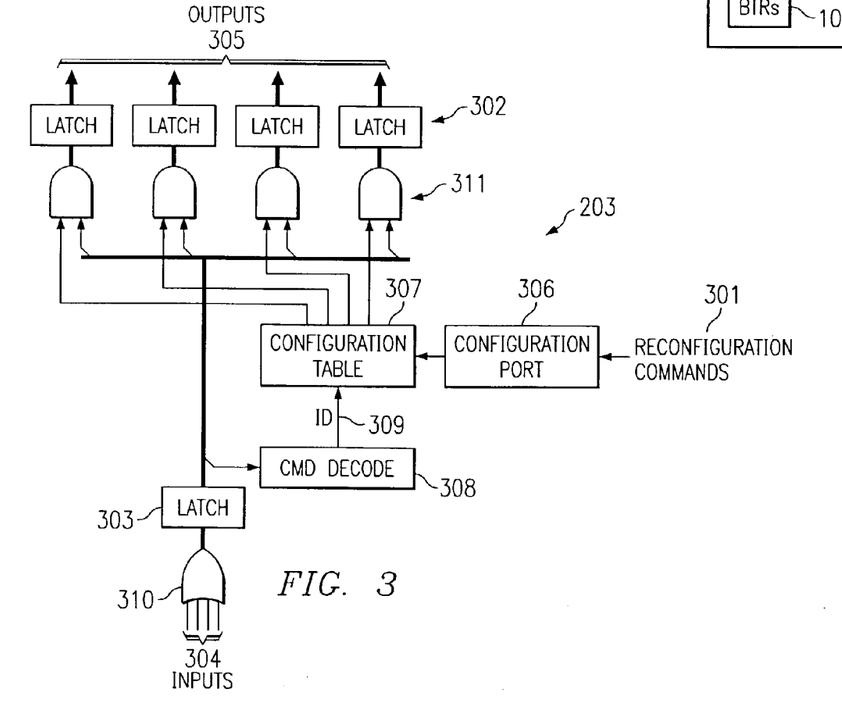
FIG. 3 depicts an example of an instance of the branch transport cell of branch transport network FIG. 2.

FIG. 3 depicts a preferred embodiment of a branch transport cell 203 of FIG. 2. For example purposes, cell 203 is depicted, which as shown in FIG. 2, is an upper level cell that is only connected to other cells. An example of cell 204 would be similar to cell 203, but would in addition include an input from the processing element (from the branch unit) as well as an output to the process element (via the latency padding buffers).

Branch transport cells have a plurality of inputs 304 and outputs 305, as needed, to construct networks of varying topology and scale. The number of inputs and outputs can be varied, as needed, either by adding (subtracting) input ports into the input OR gate 310 or by adding (subtracting) output ports with corresponding AND gates 311 and configuration table bits to control these outputs. (Note that in FIG. 3, the AND and OR gates are used in a stylized manner to each represent an array of gates. Each array contains as many single-bit gates of the respective type as the width of the network data path. For the AND gate, the control bit coming from configuration table 307 is replicated as needed to supply control bit to every member of each array.) Branch transport networks are constructed using flexible rules for interconnecting cells. Branch outputs emerging from a cell are wired to branch inputs into logically adjacent cells in order to construct larger multi-cell networks. The network should preferably be wired so that any PE can initiate a branch command to control all other PEs.

As depicted in FIG. 3, the cell preferably includes pipeline latches 302, 303 that allow the branch transport network to operate at a very high clock speed. However, as shown, it takes two clock cycles for a branch command to traverse each cell. Thus, these latches may be eliminated to reduce the number of clock cycles it takes to traverse a branch transport network. In this case, a lower clock speed may be needed to ensure proper synchronous circuit timing.

Each cell preferably includes a configuration table 307. Each table includes information for routing branch commands through its cell. For each Route ID, the tables in the network cells collectively specify the topology. The tables 307 preferably comprise a plurality of topologies indexed by Route ID 309. Each topology preferably specifies a different route through the network and/or different destination processing element or elements. The command decoder 308 decodes the Route ID 309 from the branch command inserted into the network by the branch unit 105. Thus, the Route ID selects a network path that determines the route of the branch command through the network. The selected network path is preferably specified using an output switch bit vector that has a single bit position for each output path emerging from the cell along which branch messages may be routed. Each potential output path is controlled by an AND gate 311 that determines whether the branch message propagates to the corresponding output or is replaced by zeros. A bit position in the output switch bit vector is 1 if the branch message is to be routed to the node of the output (e.g. a neighboring cell or a processing element), and 0 if the message is not routed through the corresponding output switch (AND gate) to the node of that output. Thus, the branch command, through its Route ID, includes the intended scope of the branch, as defined by the cluster or set of processing elements that it is intended to reach.

A branch command is propagated from transport cell to transport cell. The Route ID identifier in the branch command may be used at each successive cell to determine which transport cell(s) should be visited in the next step. Note that a network path should not be cyclic. If a network path has a cycle, then any branch message reaching that cycle traverses it indefinitely.

Note that the cell design of FIG. 3 preferably assumes that a null command (a command that performs no operation) is represented as a binary string of zeros. This allows the OR gate 310 at the input of the branch propagation cell to serve as a switch's merging element. Thus, units that do not want to insert commands into the network send a null command to ensure correct operation of the network. When a single input to this OR gate 310 is non-null (at least one bit is non-zero), then that input will be propagated through the OR gate 310 to its output without any corruption or change of value.

The branch transport cells 203, 204 are programmed by loading their respective configuration tables. A configuration table port 306 is provided for this purpose. The values loaded in the tables determine the available branch network topologies supported by the branch transport network. These configurations specify the clusters that partition the processing elements into MIMD mode, VLIW, mode, or mixed mode. The configuration tables are loaded in such a way that the output switches 311 route branch commands to all of the intended branch command destinations, e.g. the processor element(s) within each cluster.

Figure 4:
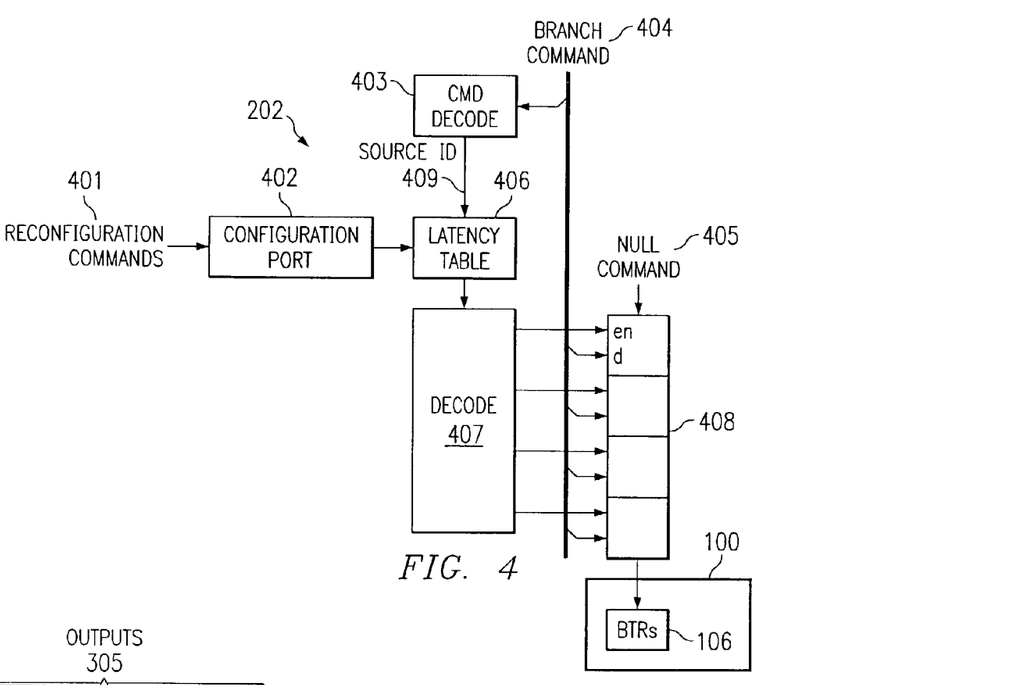
FIG. 4 depicts an example of a preferred arrangement for the latency padding buffers of FIG. 2.

FIG. 4 depicts an example of a preferred arrangement for latency padding buffer 202 as shown in the network 200 of FIG. 2. Note that when a branch command is transmitted to multiple destinations, some destinations may be reached more quickly than others. When a branch command is inserted into the branch transport network, it is sometimes desirable that all branch destinations are reached simultaneously. To achieve this goal, a branch command may be further delayed, by a source dependent amount, when it reaches each destination. This would allow equal transmission time to all processor elements, even though some processor elements are closer to the branch command origin than others in the branch transmission network. The maximum transmission latency for a branch command may be determined by the longest network path between its source PE and any destination PEs. Note that in some embodiments, not every PE has a latency buffer. Some embodiments may embed latency buffers within the network, allowing the effect of a latency buffer to be shared between PEs.

The buffer 202 allows branch commands to be delayed by some appropriate time, as defined in latency table 406. In one embodiment, the amount of delay depends on the originating processing element. Each PE is assigned a unique source identification. This information may be appended to the branch command and used to select padding latency. The branch command 404 may be decoded by command decoder 403 to obtain source identifier 409, which is used to index into latency table 406. This table comprises the delay values to be used in delaying delivery of the branch command to its associated processing element. Thus, if the associated processing element is close to the originating processing element, then the delay value is larger than the delay value for a more distant originating processing element. The delay value is then provided to queue decoder 407, which then causes placement of the branch command into queue 408 at the appropriate point. The queue 408 comprises null commands 405, which are inserted at the top of the queue and processed out of the bottom of the queue. In other words, the contents of the queue are shifted down on a cycle-by-cycle basis. Thus, placing the branch command into an appropriate location in the queue replaces any null command in that location and provides the required delay before the branch command is sent to the branch target register 106 of the processing element 100. The amount of delay can be programmed into the table 406 via configuration port 402 by configuration commands 401. Note that the hold period or the amount of delay may be predetermined or may be selected based on information in the branch command. For example, the identity of the generating PE may be used to determine the hold period.

The configurable table 307 and latency table 406 can be initialized with particular values, and can be reconfigured as needed. Configuration ports 306, 402 allow both initialization and reconfiguration of the tables. Reconfiguration command 301 and/or 401, preferably issued external from system 200, is used to reconfigure one or both of the tables 307 and 406. Such command may be in the form of ("write_config_table", <name of config table>, <index of word within table>, value). This allows the values in the field programmable tables 307, 406 to be selectively added, deleted, revised, changed, or updated to desired values from a controller outside the system 200. Note that in some usage, not every branch arrive at all PEs in the same clock-cycle. While arrival at the same clock cycle is a possible usage mode, the latency buffer allows selection of other timing relationships between the arrival time at different PEs.

A particular network path may be programmed by loading data into the configuration table 307. Similarly, specific delay values may be programmed by loading data in the latency table 406. The values loaded in these tables determine the allowed configurations that are currently supported by the branch transport network. Data can be loaded into these tables using a number of methods. For example, memories that store tables could be "memory mapped" onto a common bus and loaded by a central controller. Memory mapping is a technique for referencing memory locations by providing addresses. This technique is commonly used when there is a collection of disparate memory blocks. These blocks are simply assigned unique addresses, and datapath is added so that these locations can now be referenced (loaded from and/or stored to) by using the addresses to refer to the desired location.

Serial paths have been traditionally used to load reconfigurable devices and could be utilized to load such tables. Various scan techniques have often been used to shift a set of values through long shift registers to load field programmable memories. These techniques are also appropriate for implementing an external write capability and can be used to support the initialization of branch transport configuration tables and delay lookup tables from the outside. Scan techniques are examples of using serial paths to load memories. Instead of assigning an address to each unit of memory, scan techniques link the memories up in a known order into a single sequence. Contents can be loaded into the memories by externally arranging it in the correct order, and then shift it in. Similarly, the content of the memories can be read out by shifting the entire sequence and externally extracting the desired portion.

A technique described in a related application entitled, "System and Method for Self Configuration of Reconfigurable Systems," Ser. No. 10/215,300 incorporated herein by reference, would allow self reconfiguration. A subset of reconfigurable system can reconfigure its configuration tables without interfering with the operation of the remainder of the reconfigurable system.

Figure 5:
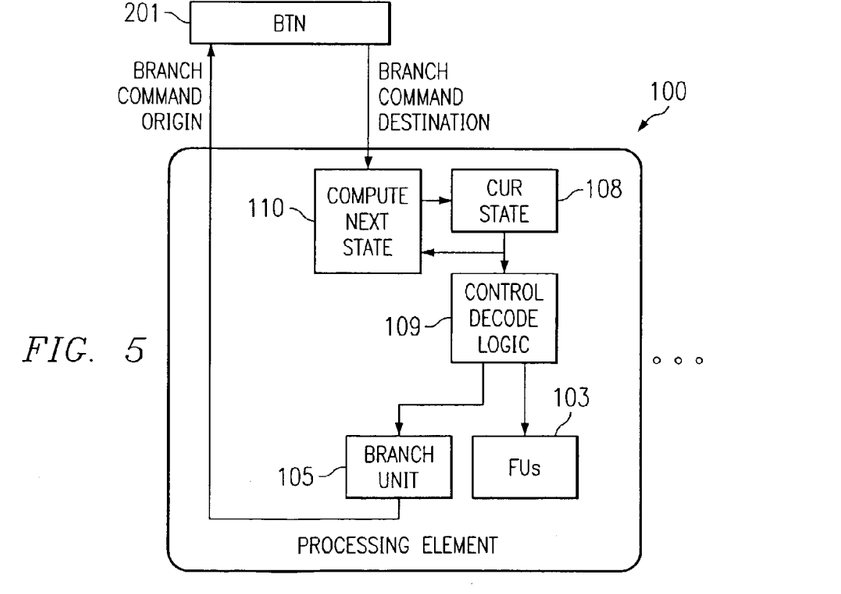
FIG. 5 depicts a block diagram of an example of a state-machine-based processing element according to an embodiment of the invention.

FIG. 5 depicts an alternate PE 100 realization where the instruction memory-based control, with its instruction memory, PC, and incrementor, has been replaced with a state machine. The state machine includes a current state 108, which is decoded by the control decode logic 109 to obtain control signals fed to the functional units (FUs) 103 and branch unit 105. The current state 108 is also an input into combinational logic for computing the next state 110. Branch commands arriving from the branch transport network 201 is an input into the logic that computes the next state 110. Status information from the FUs (not shown in FIG. 5) may also influence the computation of the next state. Branch commands are inserted into the network from the branch unit 105. The branch transport network operates as described earlier, using a Route ID carried on the branch command to determine the distribution of the branch command. The branch command also carries a branch target name that is interpreted at each destination PE, causing each destination PE's state machine to jump to a desired target current state. Different PEs in the same VLIW clusters may have different state machines. Thus the same branch target name is interpreted differently at each destination PE.

A preferred embodiment of our invention described above provides two mechanisms to change the way a branch transport network propagates branch commands emanating from the same source PE. One mechanism uses different Route IDs on the branch commands. Another reprograms the configuration tables of branch transport cells. Programming a cell's configuration table differently can cause the cell to treat branch commands carrying the same Route ID differently. The expectation is that in many embodiments, the first mechanism provides a fast way of changing the way branch commands are propagated, while the second mechanism provides a slower means to effect the change. It is conceivable that some embodiments may choose to use both techniques, while some embodiment may choose to use only one technique. In particular, a system that only uses the second mechanism can be viewed as one where there is only one entry in the configuration table 307. Since there is only one Route ID available at each cell at any time, there is correspondingly no need for a Route ID to be explicitly carried on each branch command.

What is claimed is:

1. A system for executing a program comprising:
a plurality of processing elements, wherein a processing element of the plurality of processing elements outputs a branch signal, wherein at least one of the processing elements of the plurality of processing elements comprises:
an instruction memory that stores a plurality of instructions associated with the program;
a functional unit that executes at least one operation in response to an instruction taken from the instruction memory; and a branch target lookup table that converts a target portion of the branch signal to an address of the instruction memory of the processing element; and a programmable network that transports the branch signal from the processing element to one of a first destination processing element by a first programmed transport route and a second destination processing element by a second programmed transport route;

wherein the branch signal is received and processed by the one of the first destination processing element and the second destination processing element, and is not processed by the other of the first processing element and the second processing element.

2. The system of claim 1, wherein:

the programmable network selected between the first programmed transport route and the second programmed transport route based on a portion of the branch signal.

3. The system of claim 1, wherein:

the programmable network is currently programmed with the other of the first programmed transport route and the second programmed transport route, and is re-programmed to the one of the first programmed transport route and the second programmed transport route.

4. The system of claim 1, wherein at least one of the processing element of the plurality of processing elements comprises:

a state machine that manages the execution of a portion of the program; and a functional unit that executes at least one operation of the portion of the program in response to a signal from the state machine.

5. The system of claim 1, wherein at least one of the processing element of the plurality of processing elements comprises:

a branch unit that forms the branch signal and outputs a message; and a register that receives the branch signal from the branch network.

6. The system of claim 1, wherein clusters of said processing elements form very long instruction words (VLIW).

7. A system for executing a program comprising:

a plurality of processing elements, wherein a processing element of the plurality of processing elements outputs a branch signal; and a programmable network that transports the branch signal from the processing element to one of a first destination processing element by a first programmed transport route and a second destination processing element by a second programmed transport route, wherein the branch transport network comprises:

a plurality of cells, wherein each cell further comprises:

a configuration table that comprises a listing of a plurality of paths for routing the branch signal comprising the first programmed transport route and the second programmed transport route;

wherein the configuration table is indexed by a portion of the branch;

wherein the branch signal is received and processed by the one of the first destination processing element and the second destination processing element, and is not processed by the other of the first processing element and the second processing element.

8. The system of claim 7, wherein:

a branch signal from any one processing element of the plurality of processing elements may be sent to any processing elements of the plurality of processing elements.

9. The system of claim 7, wherein each cell further comprises:

a port that is connected to the configuration table for programming the configuration table.

10. The system of claim 7, wherein:

the branch signal is pipelined through the cell.

11. A system for executing a program comprising:

a plurality of processing elements, wherein a processing element of the plurality of processing elements outputs a branch signal;

at least one latency buffer that holds a branch signal for a predetermined time period; and a programmable network that transports the branch signal from the processing element to one of a first destination processing element by a first programmed transport route and a second destination processing element by a second programmed transport route;

wherein the branch signal is received and processed by the one of the first destination processing element and the second destination processing element, and is not processed by the other of the first processing element and the second processing element.

12. The system of claim 11, wherein:

the predetermined time period is based on information in the branch signal.

13. The system of claim 11, wherein the latency buffer comprises:

a latency table that comprises a listing of a plurality of predetermined time periods;

wherein the latency table is indexed by a portion of the branch signal to select a particular predetermined time period.

14. The system of claim 13, wherein each latency buffer further comprises:

a port that is connected to the latency table for programming the latency table.

15. A system for executing a program comprising:

a plurality of processing elements, wherein a processing element of the plurality of processing elements outputs a branch signal;

wherein a portion of the plurality of processing elements are arranged into at least one cluster, wherein each cluster comprises:

at least one processing element that operates co-synchronously with any other processing element of the cluster such that execution timing relationships between processing elements of a cluster are statically predictable;

wherein latencies in the distribution and processing of branch signals issued from the at least one processing element within the cluster to any other processing element within the cluster are statically predictable, and thereby permits static scheduling of any processing elements within the cluster; and a programmable network that transports the branch signal from the processing element to one of a first destination processing element by a first programmed transport route and a second destination processing element by a second programmed transport route;

wherein the branch signal is received and processed by the one of the first destination processing element and the second destination processing element, and is not processed by the other of the first processing element and the second processing element.

16. The system of claim 15, wherein the at least one cluster comprises a first cluster and a second cluster; and a processing element that is associated with the first cluster is reconfigured to be associated with the second cluster.

17. The system of claim 15, further comprising:
a plurality of clusters,
wherein the branch signals are transported between clusters by the programmable network.

18. The system of claim 17, wherein:
a route for the branch signal is selected by the network based on a portion of the branch signal.

19. A co-synchronous system for executing a program comprising:
a plurality of processing elements that are arranged in a plurality of clusters, wherein processor element operations are synchronous within a cluster and are asynchronous between clusters, and wherein during execution of the program, a processing element of the plurality of processing elements outputs a branch signal;
wherein said processing elements are heterogeneous and can execute a different operation on each processing element; and
a network that transports the branch signal from the processing element to at least one cluster, wherein the network can be reconfigured by the branch signal;
wherein the branch signal is processed by each processing element of the at least one cluster and is not processed by another cluster.

20. The system of claim 19, wherein clusters of said processing elements form very long instruction words (VLIW).

21. The system of claim 19, wherein non branch instructions stay within said processing elements and said branch signals are transported to all of said processing elements within said same cluster.

22. A system for executing a program comprising:
a plurality of processing elements, wherein during execution of the program, a processing element outputs a branch signal; and
a network that enables at least one processing element to be one of synchronously responding to the branch signal and asynchronously operating without responding to the branch signal, and transports the branch signal from the processing element to the at least one processing element;
wherein a message formed by the processing element is used to select the one of synchronously responding and asynchronously operating for the at least one processing element.

23. The system of claim 18, wherein the branch transport network comprises:
a plurality of cells arranged such that a branch from any one processing element of the plurality of processing elements may be sent to any processing element of the plurality of processing elements.

24. A method for executing a program in a system comprising a plurality of processing elements, comprising:
outputting a branch signal by a processing element of the plurality of processing elements;
transporting the branch signal from the processing element to one of a first destination processing element by a first programmed transport route and a second destination processing element by a second programmed transport route by a programmable network; and
selecting between the first programmed transport route and the second programmed transport route based on a portion of the branch signal;
processing the branch signal by the one of the first destination processing element and the second destination processing element;
wherein the programmable network is currently programmed with the other of the first programmed transport route and the second programmed transport route, the method further comprising:
re-programming the programmable network to the one of the first programmed transport route and the second programmed transport route prior to transporting the branch signal.

25. The method of claim 24, further comprising:
converting, by the one of the first destination processing element and the second destination processing element, a target portion of the branch signal into an address of a memory of the processing element.

26. A system for executing a program comprising:
a plurality of processing elements, wherein a processing element of the plurality of processing elements outputs a branch signal; and
a programmable network that transports the branch signal from the processing element to one of a first destination processing element by a first programmed transport route and a second destination processing element by a second programmed transport route;
wherein the branch signal is received and processed by the one of the first destination processing element and the second destination processing element, and is not processed by the other of the first processing element and the second processing element;
further wherein said processing elements are heterogeneous and can execute a different operation on each processing element.

* * * * *

UNITED STATES PATENT AND TRADEMARK OFFICE
CERTIFICATE OF CORRECTION

| | | |
|---|---|---|
| PATENT NO. | : 7,194,609 B2 | Page 1 of 1 |
| APPLICATION NO. | : 10/214990 | |
| DATED | : March 20, 2007 | |
| INVENTOR(S) | : Michael S. Schlansker et al. | |

It is certified that error appears in the above-identified patent and that said Letters Patent is hereby corrected as shown below:

In column 16, line 3, in Claim 23, after "branch" insert -- signal --, therefor.

Signed and Sealed this

Twenty-ninth Day of September, 2009

David J. Kappos
*Director of the United States Patent and Trademark Office*